(No Model.) 4 Sheets—Sheet 1.
G. B. BRAINERD.
PHOTOGRAPHIC CAMERA.
No. 331,677. Patented Dec. 1, 1885.
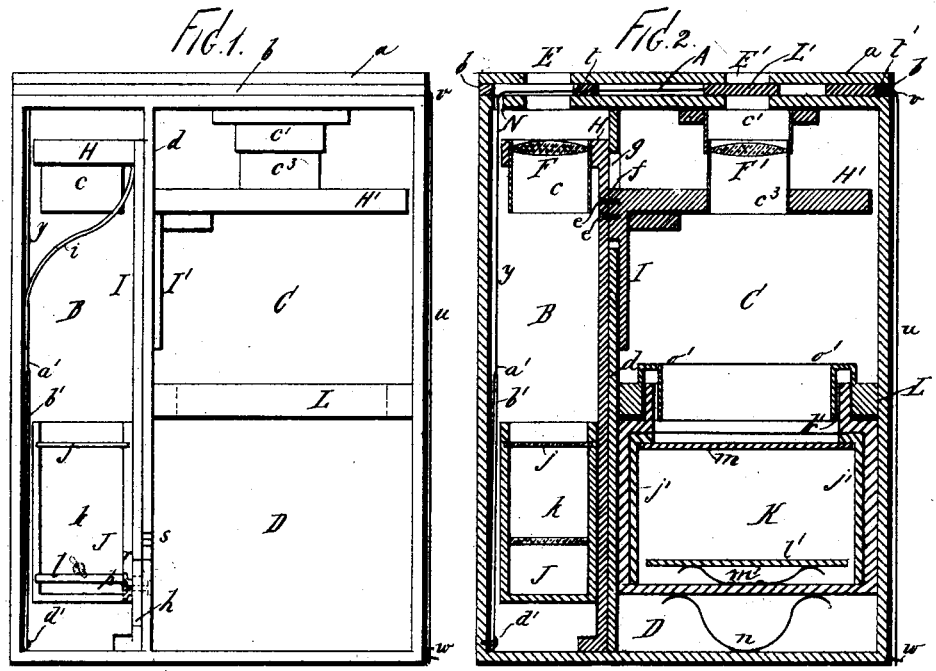
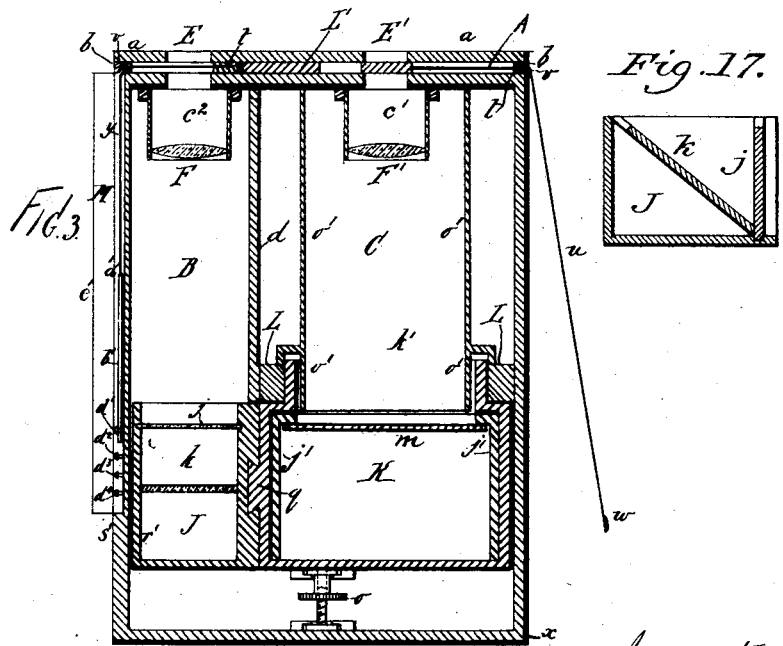
Witnesses.
John Buckler,
J. L. Rémond
Inventor:
Geo B Brainerd (No Model.) 4 Sheets—Sheet 2.
G. B. BRAINERD.
PHOTOGRAPHIC CAMERA.
No. 331,677. Patented Dec. 1, 1885.
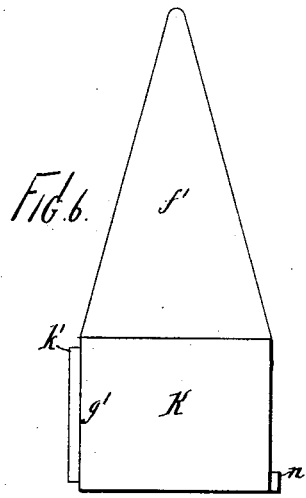
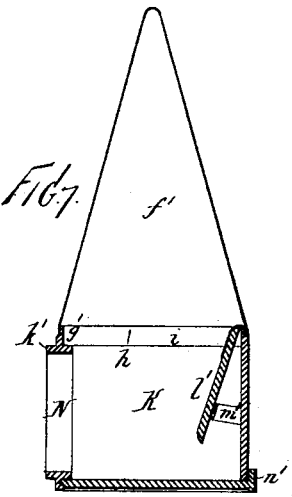
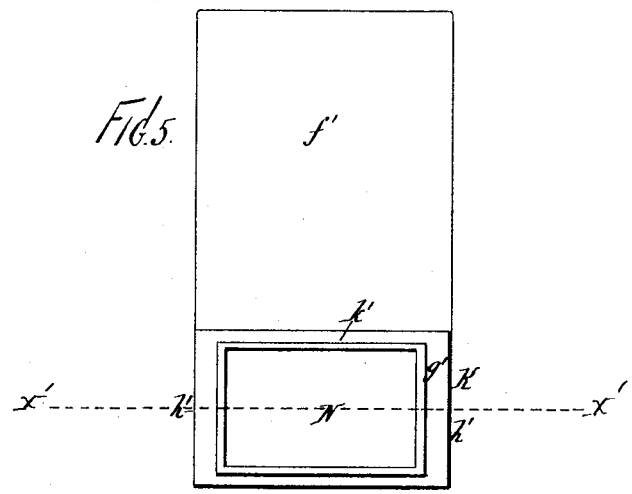
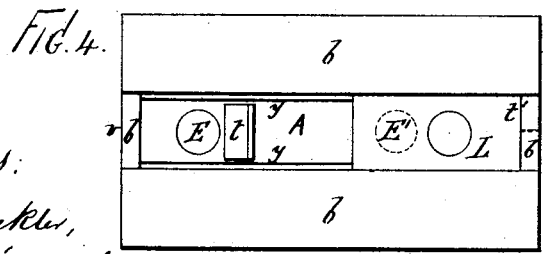
Witnesses:
John Buckler,
J. L. Rémond
Inventor:
Geo. B. Brainerd (No Model.) 4 Sheets—Sheet 3.
G. B. BRAINERD.
PHOTOGRAPHIC CAMERA.
No. 331,677. Patented Dec. 1, 1885.
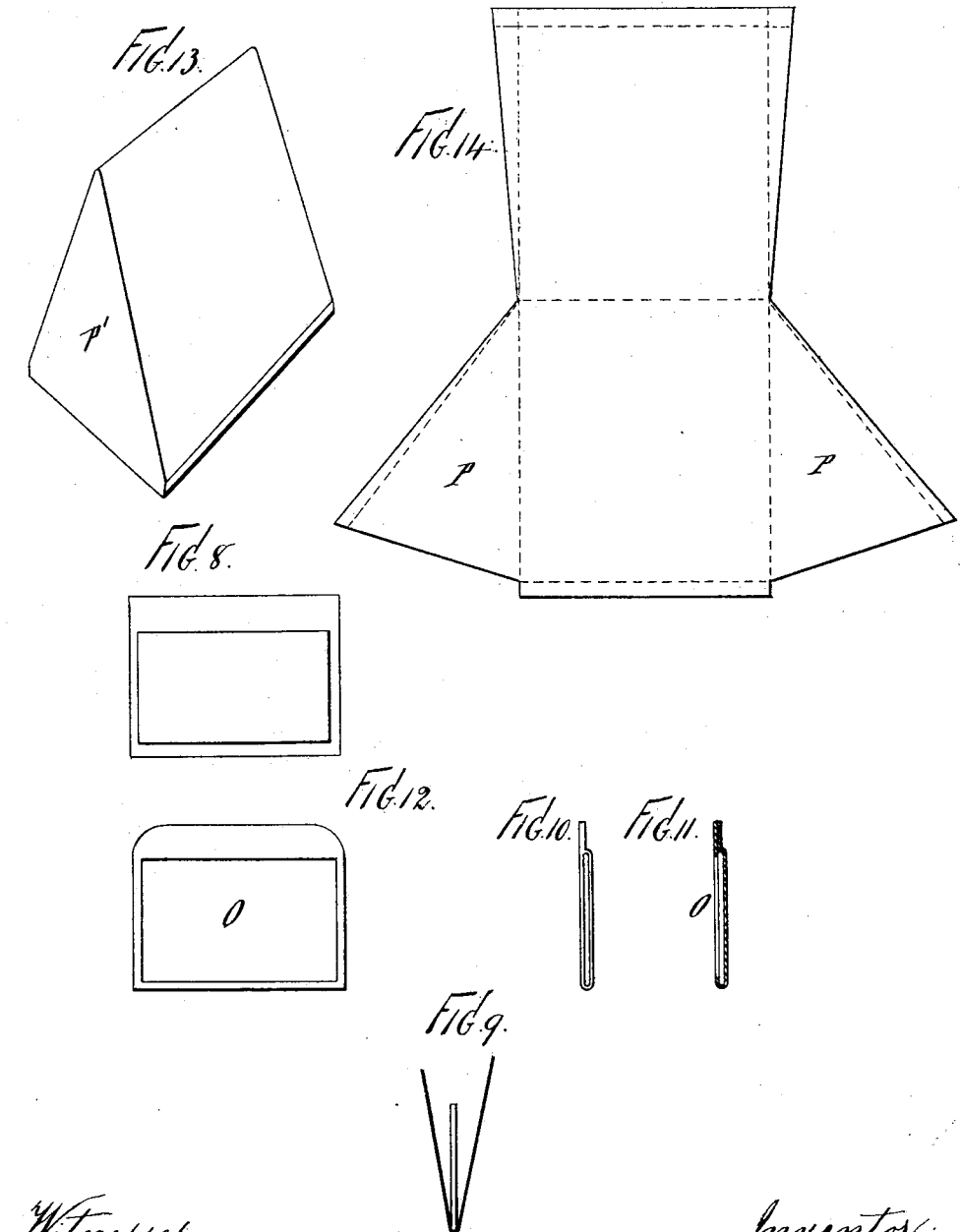
Witnesses:
John Buckler,
J. L. Rémond.
Inventor:
Geo B Brainerd (No Model.) 4 Sheets—Sheet 4.

G. B. BRAINERD.
PHOTOGRAPHIC CAMERA.

No. 331,677. Patented Dec. 1, 1885.

Witnesses:
John Buckler,
J. L. Rimond

Inventor
Geo B Brainerd

UNITED STATES PATENT OFFICE.

GEORGE B. BRAINERD, OF BROOKLYN, NEW YORK.

PHOTOGRAPHIC CAMERA.

SPECIFICATION forming part of Letters Patent No. 331,677, dated December 1, 1885.

Application filed December 2, 1884. Serial No. 149,302. (No model.)

*To all whom it may concern:*

Be it known that I, GEORGE B. BRAINERD, of the city of Brooklyn, county of Kings, and State of New York, have invented a new and useful Improvement in Photographic Cameras, of the kind popularly known as "detective" or "hand" cameras; and it consists, first, in a method of quick focusing; second, in a method of springing the shutter; third, in a method of changing and managing the plates; and, fourth, in a method of concealing the operative parts of the camera from view; and I hereby declare the following to be a full, clear, and explicit description of the invention, such as will enable others skilled in the art to which it belongs to make and use it, reference being had to the accompanying drawings, which form a part of this specification.

Figure 15:
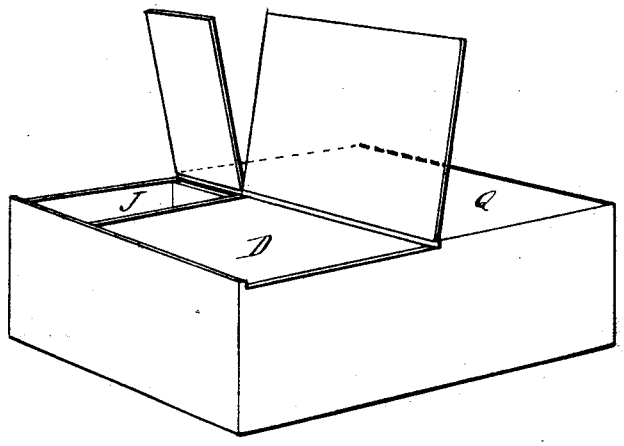
Figure 16:
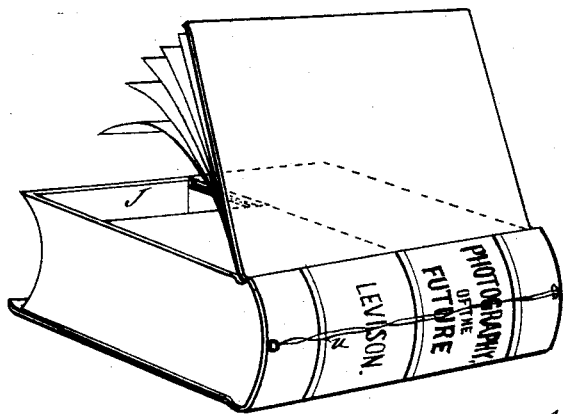

In the drawings, Figure 1 is a view from above of the interior of a camera for three and one quarter by two and one-eighth inches or other moderate-sized plates, with the top removed. Fig. 2 is a section midway between the top and bottom of the camera, and shows a method of focusing rapidly both on the finder and the plate at the same time. Fig. 3 is a similar section showing another mode of focusing on both the finder and sensitve plate at the same time. Fig. 4 is a front view of the camera with the false front removed, and shows the interior of the shutter-chamber. Fig. 5 is a front view of the plate-reservoir and changing-box with its flexible cover. Fig. 6 is a side elevation of the same. Fig. 7 is a section of the plate-box and cover, showing interior construction and the draw-bottom. Fig. 8 is a front view of a dummy-plate holder used to cover the plates in the box. Fig. 9 shows the method of folding the flexible material to make a plate-holder. Fig. 10 is an end view of a plate-holder. Fig. 11 is a section of a plate-holder. Fig. 12 is a front view of a plate-holder. Fig. 13 is a wedge-shaped form, on which the flexible cover of the plate-reservoir is formed. Fig. 14 is a pattern for cutting the pieces of opaque flexible material of which the cover of the reservoir is formed. Fig. 15 is a perspective view of a complete camera in the form of an ordinary package. Fig. 16 is a perspective view of a complete camera in the form of a book.

In all of the figures like letters indicate corresponding parts.

The body of the camera, Figs. 1, 2, 3, 15, and 16 may be made of any desired dimensions and of any suitable material, but I have found it convenient to make it of wood one-eighth of an inch thick, the front and back being usually three-sixteenths of an inch thick. Within it is divided into four compartments, of which A, Figs. 2, 3, and 4, is the shutter-slide; B, Figs. 1, 2, and 3, the finder-compartment; C, the dark-chamber and D the plate-holder compartment. Of these the compartment A, Figs. 2, 3, and 4, is virtually outside the box, being formed by a false easily-removable front, $a$, Figs. 1, 2, and 3, separated from the actual front by strips $b$ $b$ $b$ $b$, Figs. 1, 2, 3, and 4. Through both the false and real fronts of the box are openings E E', Figs. 2, 3, and 4, concentric with the tubes $c$ $c'$, Figs. 1 and 2, $c^2$ $c'$, Fig. 3, the lenses F F', Figs. 2 and 3, and the axes of the chambers B and C, Figs. 1, 2, and 3.

$d$, Figs. 1, 2, and 3, is a partition which forms the side of the dark-chamber C and divides it from the finder-compartment B, or in the case of cameras otherwise made may form one side of the box. Lenses of similar focal lengths are set in the short tubes $c$ $c^3$, Figs. 1 and 2, and $c^2$ $c'$, Fig. 3. The lens-tube $c^3$, Figs. 1 and 2, fits closely but freely within the corresponding tube, $c'$. The lens-tubes $c$ $c^3$, Figs. 1 and 2, are fixed to the shields H H', which are right-angled projections from pieces I I' upon opposite sides of the partition $d$. The pieces I I' are smaller in dimensions than the partition $d$, and are joined firmly together by screws E E, which clamp the piece I' against the extension $f$ of the piece I. The extension $f$ of the piece I is somewhat thicker than the partition $d$ and somewhat smaller than the longitudinal slot $g$, Fig. 2, in the partition $d$.

By means of the finger inserted in a slot in the piece I, Fig. 1, above the finder at the point $h$, the piece I, which may be distinguished as the "carrier," may be moved back and forth, and carries with it both the shields H H' and the lenses F F'.

A spring, $i$, Fig. 1, pressing against the carrier I, serves the triple purpose of preventing the vibration of the lenses, keeping the carrier I against the partition $d$ so closely as to prevent diffusion of light from the compartment B into the chamber C, and holding the carrier I by friction against the partition $d$ in any position in which it may be placed.

Within the compartment B is a finder consisting of a vertical ground-glass screen, $j$, Figs. 1, 2, 3, and an inclined mirror, $k$, together within a separate box, J, which is narrower than the compartment B, but is fixed to the bottom of the camera by a thumb-screw, $l$, Fig. 1, under the inclined mirror $k$. By removing the mirror and thumb-screw the finder J may easily be removed from the chamber B.
When in position, the finder J is so situated within the chamber B that its ground-glass screen is in a plane with the sensitive plate $m$, Figs. 2 and 3, which is ready to be exposed, this plate being in a holder which is pressed against the front of the separate plate-box K, below described, which plate-box is pushed forward against the frame L by a removable spring, $n$, in the form of camera Figs. 1 and 2, or by a screw, $o$, in the form of camera Fig. 3. When, therefore, the lens F is moved by the carrier I until an image of any object opposite the opening E is seen sharply defined on the finder-screen $j$, the lens F' is simultaneously adjusted to project a nearly similar equally sharp image of the same object upon the sensitive-plate $m$. In case it be desired to fix the focus for any special distance the carrier I may be clamped to the partition $d$ by the thumb-screw $p$, Fig. 1. The focusing of the picture may be equally effected by the modification or method shown in Fig. 3, in which the partition $d$ terminates at the frame L. The lenses are fixed in the tubes $c^2$ $c'$ and the supports H H'. The pieces I I', spring $i$, &c., are dispensed with. The finder-box J is attached to the plate-box K by a dovetailed joint, $q$, which permits either box to be readily removed without the other, and the two boxes are movable equally backward and forward by the screw $o$ of peculiar construction, and the focusing thereby effected by reference to the finder only. The screw $o$ consists of a long nut with a milled head at one end, and a circular plate at the other which drops into a fixture attached to the box $k$, and engages with a screw with a square head which drops into a fixture attached to the back of the camera. Special objects, as persons standing erect, may, however, be quite sharply focused with a fixed finder of any size or kind since they average about the same height. The camera is focused by any convenient means once for all for a figure standing at, say, twenty feet, or at such distance that it is of a suitable height on the plate. The height of the image in the finder is noted and may be marked on the finder-screen, and thereafter a sharp picture may be obtained by approaching a person until the image is of the desired size. The camera may also be focused without reference to the finder by the aid of an indicating-mark, $r$, drawn upon the carrier I, Fig. 1, or the edge of the finder-box at $r'$, Fig. 3, and a scale with the divisions of which the mark $r$ $r'$ may be moved to coincide, drawn upon the partition $d$, as at $s$, Fig. 1, or upon the edge of the camera, as at $s'$, Fig. 3. Each division of the scale corresponds to a position of the lens F', Fig. 2, or a position of the plate-box K, Fig. 3, which determines on the plate $m$, Fig. 3, a sharp picture of any object at an established distance. In the case of cameras having no finder or in which the finder-lens differs in focal length from the camera-lens the scale becomes essential for fine focusing at various distances.

The desired exposure of the sensitive-plate is effected by means of a snap-shutter, L', Figs. 2, 3, and 4, and appendages, as follows: The shutter L' consists, simply, of a perforated card or piece of wood well black-leaded, sliding within the compartment A, and of such length and width that whether it be drawn against the stop $t'$, as in Figs. 2 and 4, or against the stop $t$, as in Fig. 3, one or the other of its ends completely covers the opening E'. To one end of the shutter L' is firmly attached a black-leaded cord, $u$, Figs. 1, 2, 3, 4, which passes through a smooth well black-leaded hole, $v$, and terminates in an eyelet-ring, $w$. The cord $u$ is of such length that when the shutter L' is close against the stop $t'$ the ring $w$ just slips over a backwardly-inclined pin, $x$, which is preferably driven in the end of the back of the outer box, but may be otherwise located. To the opposite end of the shutter L' are fastened the two ends of a cord, $y$ $y$, Figs. 1, 2, 3, 4, which are guided on opposite sides of the opening E by the stop $t$, Fig. 4, and passing together through a well-black-leaded hole, $z$, to the inside of the box, as in Figs. 1 and 2, or the outside of the box, as in Fig. 3, are united at $a'$ by a loop to a rubber band, $b'$. The other end of the rubber band may be caught at pleasure upon the pin $d'$, Figs. 1, 2, 3, whereby it is more or less stretched when the shutter L' abuts against the stop $t$, or it may be extended to the pins $d^2$ $d^3$ $d^4$, Fig. 3, and its tension being thus increased the velocity of the shutter may be accelerated.

In order to transfer the rubber band to other pins in cameras of the form shown in Figs. 1 and 2, the finder-box must be removed, which contingency is provided for by the thumb-screw $l$, or a device to be hereinafter described; but in Fig. 3 the rubber band and retaining-pins are sunken in a long slot, M, provided with a cover, $e'$, which may be opened at pleasure and afford easy access to the rubber band without removal of the finder.

In five by eight inches and others of the larger sizes of cameras, in which the finder is proportionately very small and inserted in one corner of the dark-chamber in order to restrict the camera in size, the covered side slot, M, becomes an important feature, and may be made in the form of a long narrow box occupying part of the dark-chamber. The chamber C should be perfectly light-tight. To insure that no extraneous light reach the plate in Fig. 1 by diffusion through the crevice between the nose of the box K, Fig. 2, and the frame L, a thin metal trough, O', may be fixed to the frame L, and will restrict the action of any diffused light so entering to a very narrow margin of the plate m. When the form of camera admits, the front of the trough O' may be extended to the front of the camera, as in Fig. 3, and constitute an internal tube or box, which will protect the plate from diffused light in case of defects in construction of the chamber C.

The next important feature of my camera is the plate-box K and its flexible cover f', of which Fig. 5 is a front elevation, Fig. 6 a side elevation, Fig. 7 a vertical section through the front and back, and K, Figs. 2 and 3, are cross-sections on the line x' x', Fig. 5. It consists of a rectangular box three-sixteenths of an inch thicker on the front g' inside, and one-eighth of an inch thicker on the sides h' h' below the line i', Fig. 7. The extra thickness inside is indicated by j' j' in the section K, Figs. 2 and 3. In the front there is a rectangular opening, N, a little larger than the desired picture. This opening N is surrounded by a projecting rim or nose, k', Figs. 2, 3, 5, 6, 7, which fits closely but freely within the frame L, Figs. 1, 2, and 3, when the box is placed in the chamber D and pushed forward by the spring n, Fig. 2, or by the screw o, Fig. 3, or otherwise. Within the plate-box K and attached to the top edge of the back by a cloth or other hinge is a flap, l', Fig. 7, which rests against a spring, m'. Over the box is a bag, f', glued around the top edge of the box in a depression, so that the outside of the box may remain flat. By withdrawing the bottom n', Figs. 6 and 7, of the box K, the plates in their holders may be inserted therein in such numbers that the spring m' and flap l' may hold the first plate-holder firmly against the front of the box. In front of the plates, however, is placed a dummy or flat cover, Fig. 8, of the same size as the plate-holders, but having an extension in thickness, which closely fits within the opening N, and forms a light-locked cover when the box may be brought into the sunshine without injury to the plates contained within. After the box is placed in the camera this cover and the plate-holders may be successfully removed from the front to the back if grasped by the upper edge through the cloth cover or bag, raised up, and pushed down behind, which proceeding is facilitated by the V-shaped opening formed by the back of the back plate-holder and the inclined flap l'. Any number of boxes thus charged may be introduced in the camera and again removed after the plates are exposed, even in full sunshine. In order to facilitate the operation of changing boxes, the spring n, Fig. 2, the focusing-screw o, Fig. 3, and the box K are made easily removable.

The plate-holders may be made of various kinds of material, and in various ways; but one of the best and simplest is that shown in Figs. 9, 10, 11, and 12. A sheet of No. 1 card-mount of suitable width is wet by a sweep of a wet brush across the middle, and then carefully bent double, as shown in Fig. 9, over a sheet of glass about one-eighth of an inch longer and one-sixteenth of an inch wider than the plate to be used. One side of it is then wet in a line along the other edge of the glass, the softened edge bent in by clamps against the other, as shown in Fig. 10, and the two edges glued together. When it is dry, the opening O, Figs. 11, 12, is carefully cut to the exact size of the desired picture, and the card-holder then thoroughly varnished outside with several coats of thin shellac or other suitable varnish and blackened with lamp-black. The glass is then broken and removed, and the inside varnished, and finally the entire plate-holder is thoroughly black-leaded. When a number of plate-holders are placed together, all facing one way, the thin edge of the front plate is easily grasped through the cloth bag, since the space left by the extra lining j' of the box K facilitates the manipulation of the plates.

The form, construction, and material of the bag f' are of great importance.

Fig. 13 represents a wooden wedge, whose base is the same size as the top of the box K, and whose height is about one inch greater than the height of two plate-holders. Over this wedge a piece of rubber cloth—thin, but free from pin-holes, and of the shape shown in Fig. 14—is folded, face up, in such a way that the wings P P cover the ends P' of the wedge, Fig. 13, the overlapping edges being glued with fish-glue. When this is dry, a second similar piece is folded over it in the reverse direction, face down, and its overlapping joints glued in a like manner, and in this way a bag is formed with broken joints, perfectly light-tight, which, when removed from the wedge or mold, preserves the shape previously described, which is found to occupy little space, yet to be practically available for the purpose desired. When the plate-box K, with its bag, which may also be made of other material than rubber cloth, is placed in its position in the camera, as shown in Figs. 2 and 3, the bag folds over into the space occupied by the spring n, Fig. 2, or the screw o, Fig. 3, and the cover may then be placed flat upon the box.

The top of the camera, as shown in Fig. 15, consists of a cover, Q, which is permanently fixed to the box, and two covers hinged thereto—one for the finder and the other for the plate chamber.

The outside finish of the camera when designed to attract as little attention as possible is a matter of some importance. It may consist of a simple wrapping of Manila paper glued where it may be necessary and tied with a cord, in which case the camera resembles a very common kind of package; but it may also be bound, as in Fig. 16, to represent a book, in which case the cord *u* may be a silk ribbon, in imitation of a book-mark, a loose cover serve to shade the finder, and the front openings in the end of the book be obscured by imitation repetition, forming the finish on the edges of the apparent leaves. A few fly-leaves serve to assist the deception. The parts of the shutter visible from the front must be colored or ornamented to correspond with the front of the box.

As a matter of convenience, the top and bottom of the camera may be made alike—that is to say, covers similar to those shown in Figs. 15 and 16 may also form part of the bottom of the box, and then the finder and plate-reservoir may be inserted from either side, and the camera may be changed from a right-handed to a left-handed camera at pleasure.

If preferred, the plate-holders may be made of hard rubber, sheet metal, or linen-back paper, instead of plain paper, and of a form differing in minor details from that described, which, however, I find to answer this purpose.

The object in modifying the material is to increase the durability of the holder, and in modifying the form is to avoid scratching the face of the plate as it is inserted in the holder or withdrawn from it; but if the plate-holder, as described, be sprung open by pressing upon its edges, the plate may be inserted or withdrawn without injury.

In cameras of the form shown in Figs. 1 and 2 the flexible cover may be glued to the compartment D. The opposite side of the compartment D may be made to open, and thus the separate box K be dispensed with.

To take a picture with the camera, hold it in the hand, direct it toward the object by guess, or locate the object in the finder-focus. If necessary, snap the shutter, move the plate back in the box, and reset the shutter.

Having now described my camera, what I claim, and desire to patent, is—

1. In a photographic camera, the focusing device consisting of telescopic tubes, a lens therein fixed, and a finder-lens, combined with a carrier and screens, substantially as described.

2. In a photographic camera, a focusing device consisting of telescopic tubes, a support therefor in a dark-chamber, and a lens therein fixed, combined with a finder-lens in a separate chamber and a carrier, substantially as described.

3. In a photographic camera, a lens-support in an exposing-chamber, combined with a lens-support in a separate finder-chamber and a carrier, substantially as described.

4. In a photographic camera, a lens-support in an exposing-chamber, combined with a lens-support in a separate finder-chamber, a carrier, and a removable finder, substantially as described.

5. In a photographic camera, a lens-support in an exposing-chamber, combined with a lens-support in a separate finder-chamber, a carrier, and a removable plate-box, substantially as described.

6. In a photographic camera, a lens-support in an exposing-chamber, combined with a lens-support in a separate finder-chamber, a carrier, a removable finder-box, and a removable plate-box, substantially as described.

7. In a photographic camera, a lens-support in a dark-chamber, combined with a carrier and a removable plate-box, substantially as described.

8. In a photographic camera, a movable lens-support, combined with a carrier, a slotted partition, and a spring, substantially as described.

9. In a photographic camera, a separate plate-box and a separate finder, combined by a detachable joint, substantially as described.

10. In a photographic camera, a separate plate-holding box and a separate finder-box, combined with a removable focusing-screw, substantially as described.

11. The combination of a finder-box and a plate-box united by a dovetailed or separable joint with a slotted fixture attached to the combined box, a slotted fixture attached to a photographic camera, and a focusing-screw, substantially as described.

12. In a photographic camera, a finder-lens in a finder-chamber and a photographic lens in a separate exposing-chamber, combined with a finder-box and a plate-box united by a separable joint, and a device for moving both boxes forward or backward or retaining them in any position, substantially as described.

13. A fixed lens, a removable reservoir of plates in separate holders, and a slot attached thereto, combined with a removable focusing or retaining screw and a slotted fixture attached to a photographic-camera box, substantially as described.

14. A focusing device consisting of a slot attached to a removable plate-holding box and a slotted fixture attached to a photographic camera, combined with a focusing-screw and nut flanged to fit therein, substantially as described.

15. In a photographic camera, a plate-reservoir smooth inside, with a flexible cover and a projecting nose, substantially as described.

16. In a photographic camera, the combination of a plate-holding magazine smooth inside and having a flexible cover and a projecting nose with a partition or frame adapted to fit on said nose, substantially as described.

17. In a photographic camera, a plate-holding box with a projecting nose, a removable bottom, and a frame forming one side of an exposing-chamber, substantially as described.

18. In a photographic camera, a separate plate-holding box with a projecting nose, a removable bottom, a flexible cover, a flap, and a spring, combined with a frame forming one side of an exposing-chamber, substantially as described.

19. In a photographic-plate holder, the combination of a flexible cover with a box open on one side containing a spring-compress and having a sliding bottom, substantially as described.

20. The combination of a double flexible cover with break-joint seams with a box to form a photographic-plate holder, substantially as described.

21. The combination of a wedge-shaped flexible bag with a box to form a photographic-plate holder, substantially as described.

22. The combination of a double wedge-shaped flexible bag with a box to form a photographic-plate holder, substantially as described.

23. The combination of a double wedge-shaped bag having break-joint seams with a box to form a photographic plate holder, substantially as described.

24. In a photographic-plate-holding box or reservoir, the combination of a plate-holder with thin edges and a flexible cover, substantially as described.

25. In a photographic camera, a plate-reservoir or plate-changing box with a light-tight flexible cover, combined with a plate-holder having thin edges, substantially as described.

26. In a photographic camera, a plate-reservoir or plate-changing box with a light-tight double flexible cover, combined with a plate-holder having thin edges, substantially as described.

27. In a photographic-plate-holding box, a wedge-shaped, flexible cover combined with a plate-holder having thin edges, substantially as described.

28. In a photographic-plate-holding box, the combination of a light-tight double wedge-shaped flexible cover with plate-holders having thin edges, substantially as described.

29. In a photographic-plate-holding reservoir, the combination of a flexible cover with a box adapted to contain one or more plates or plate-holders, and provided with a lining terminating so far below the top of the plates or plate-holders as to leave space to insert the fingers between the top of the plates or plate-holders and the inside of the box above said lining and thereby grasp and withdraw a plate or plate-holder, substantially as described.

30. In a photographic camera, a plate-box or changing-box cover consisting of two pieces of opaque flexible cloth of the form shown, combined to constitute a wedge-shaped bag with break-joint seams, substantially as described.

31. In a photographic-plate holder or changing-box, a movable screen or dummy plate, in combination with a flexible opaque bag, substantially as described.

32. In a photographic camera, a plate box or reservoir smooth inside and having a flexible cover, combined with plate-holders and a compress, substantially as described.

33. In a photographic camera, the combination of movable lens-supports, a carrier, and a finder with a plate-reservoir or plate-changing compartment, smooth inside, having a flexible cover, and containing plates in separate plate-holders compressed by a spring-compress.

34. In a photographic camera, a removable plate-holding reservoir or changing-box with a projecting nose, a hinged or sliding bottom, and a frame forming one side of an exposing-chamber, substantially as described.

35. In a photographic camera, a plate-holding reservoir or changing-compartment having an inner reduced lining, a flexible cover, and a spring-compress, and open on one side toward an exposing-chamber, substantially as described.

36. In a photographic camera, the combination of a flexible cover with a plate-changing compartment adapted to contain separate plate-holders and reduced in size by an inner lining so arranged as to leave a space between the front and sides of the plates or holders near the top, substantially as described.

37. In a photographic camera, an exposing-shutter operated behind a false front and before the lens and where it is visible before or after exposure, through the exposing-aperture, colored or ornamented to conform with the color or design upon the front of the camera, substantially as described.

38. In a photographic camera, a flexible plate-holder cover constructed of two layers of flexible material glued together only at the edges and not throughout, substantially as described.

39. In a photographic camera, a photographic lens in an exposing-chamber and a finder-lens in a separate chamber, combined with a finder-box and a plate-box united by a separable joint, and a device for moving both boxes forward and backward, or retaining them in any position, substantially as described.

40. In a photographic camera, a plate-holding reservoir or plate-changing compartment having a flexible cover and a spring-compress and open on one side toward an exposing-chamber, substantially as described.

GEO. B. BRAINERD.

Witnesses:
JOHN MISSING,
J. D. RÉMOND.